US006793356B2

(12) United States Patent
Kumata et al.

(10) Patent No.: US 6,793,356 B2
(45) Date of Patent: Sep. 21, 2004

(54) OMNIDIRECTIONAL VISION SENSOR

(75) Inventors: Kiyoshi Kumata, Kyoto (JP); Shinichi Tanaka, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 392 days.

(21) Appl. No.: 09/905,779

(22) Filed: Jul. 13, 2001

(65) Prior Publication Data

US 2002/0006000 A1 Jan. 17, 2002

(30) Foreign Application Priority Data

Jul. 13, 2000 (JP) ........................................ 2000-213530

(51) Int. Cl.⁷ ................................................. G02B 5/10
(52) U.S. Cl. ..................... 359/852; 359/853; 359/854; 359/725; 359/729
(58) Field of Search .............................. 359/852–854, 359/725–729, 858, 859, 838, 866, 867, 730, 731, 869; 348/36–39, 143, 335, 207; 362/518, 544, 297, 304, 305, 346

(56) References Cited

U.S. PATENT DOCUMENTS

| 1,616,279 | A | | 1/1927 | Parodi | |
|---|---|---|---|---|---|
| 6,028,719 | A | | 2/2000 | Beckstead et al. | ........... 359/725 |
| 6,204,916 | B1 | * | 3/2001 | Norita et al. | ............ 356/141.1 |
| 6,222,683 | B1 | * | 4/2001 | Hoogland et al. | .......... 359/725 |
| 6,333,826 | B1 | * | 12/2001 | Charles | ....................... 359/725 |
| 6,356,296 | B1 | * | 3/2002 | Driscoll et al. | ............... 348/36 |
| 6,424,377 | B1 | * | 7/2002 | Driscoll et al. | ............. 348/335 |
| 6,597,520 | B2 | * | 7/2003 | Wallerstein et al. | ........ 359/725 |

FOREIGN PATENT DOCUMENTS

| DE | 1117897 | 11/1961 |
|---|---|---|
| JP | 06-295333 | 10/1994 |
| JP | 08-111798 | 4/1996 |
| JP | 10-105840 | 4/1998 |
| JP | 11-4373 | 1/1999 |
| JP | 11-164292 | 6/1999 |
| JP | 11-183637 | 7/1999 |
| JP | 11-218409 | 8/1999 |
| JP | 11-355763 | 12/1999 |
| JP | 2000-128031 | 6/2000 |
| JP | 2000-322564 | 11/2000 |
| WO | WO 00/11512 | 3/2000 |

OTHER PUBLICATIONS

Japan Patent Office Communication dated Sep. 11, 2003 (3 pp.) for corresponding application No. 2000–213530.
European Patent Office Search Report mailed Nov. 21, 2003 (3 pp.) for corresponding application No. 01306071.0–2217.
Korean Office Action mailed Feb. 9, 2004 (2 pp.) for corresponding application No. 9–5–2004–004669926.

* cited by examiner

Primary Examiner—Mohammad Sikder
(74) Attorney, Agent, or Firm—Edwards & Angell, LLP; David G. Conlin; George W. Hartnell, III

(57) ABSTRACT

An omnidirectional vision sensor includes: an optical system including a body-of-revolution mirror having a convex portion and having a symmetrical structure with respect to a revolution axis, wherein the body-of-revolution mirror includes a cutaway section in the convex portion of the body-of-revolution mirror so as to allow light incident from surroundings of the revolution axis of the body-of-revolution mirror to be collected; and imaging means, including a light-receiving element for receiving the collected light and image processing means for converting an optical image generated from the collected light received by the light-receiving element into image data. The revolution axis of the body-of-revolution mirror and an optic axis of the light-receiving element coincide.

10 Claims, 6 Drawing Sheets

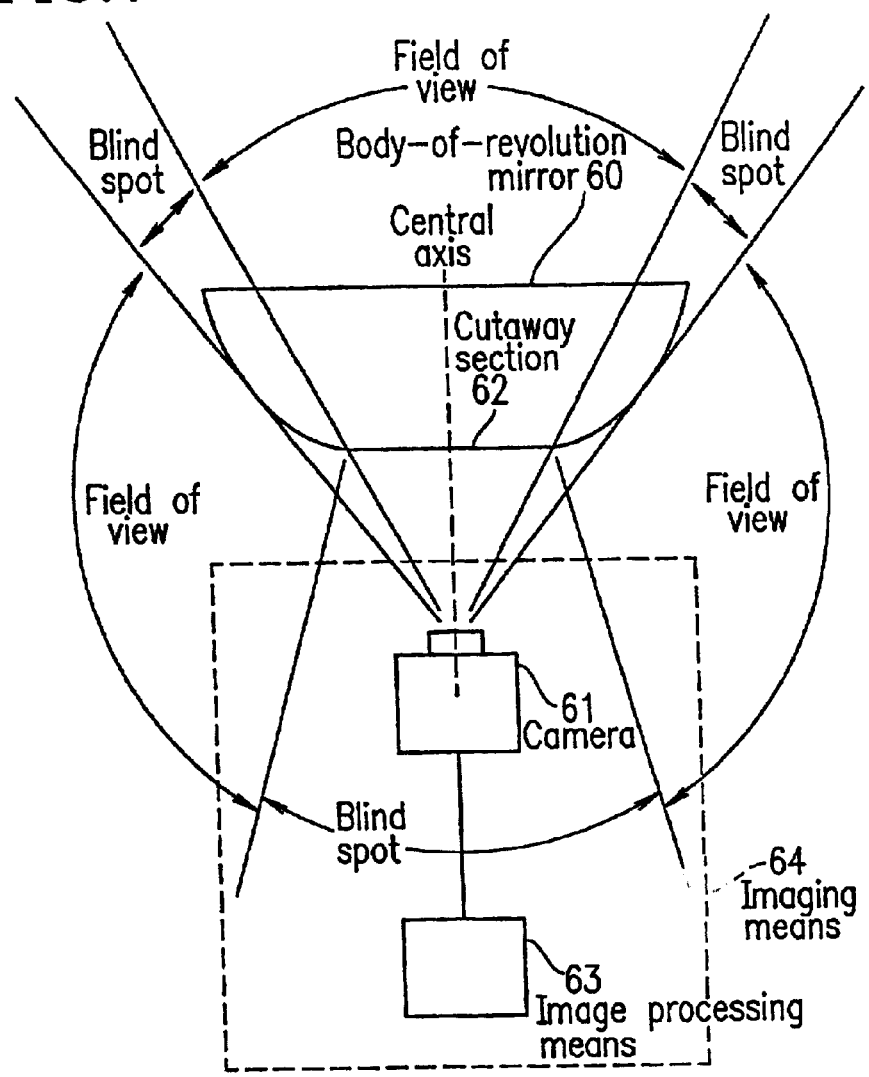

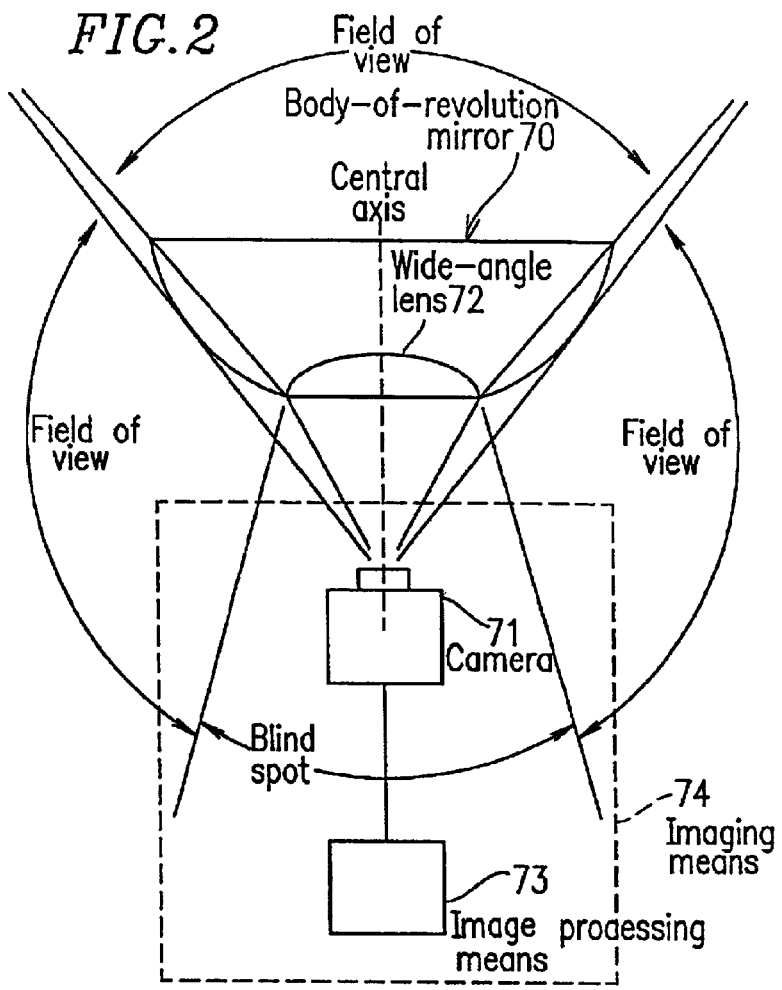
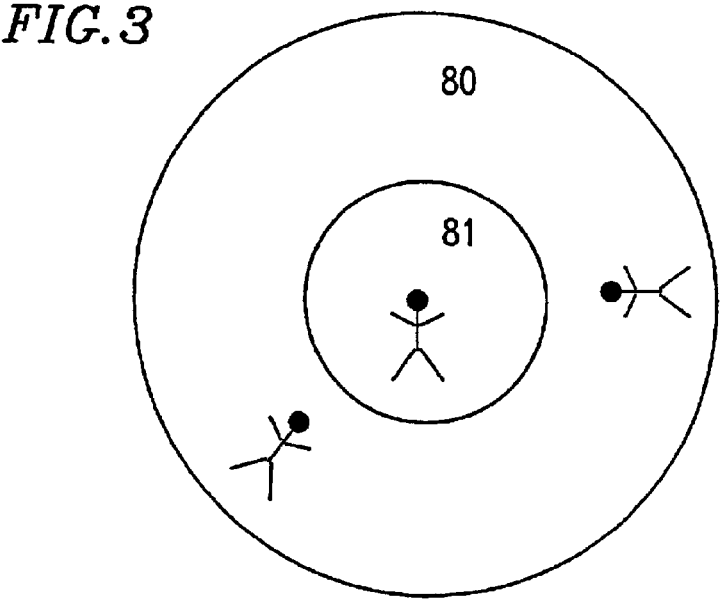

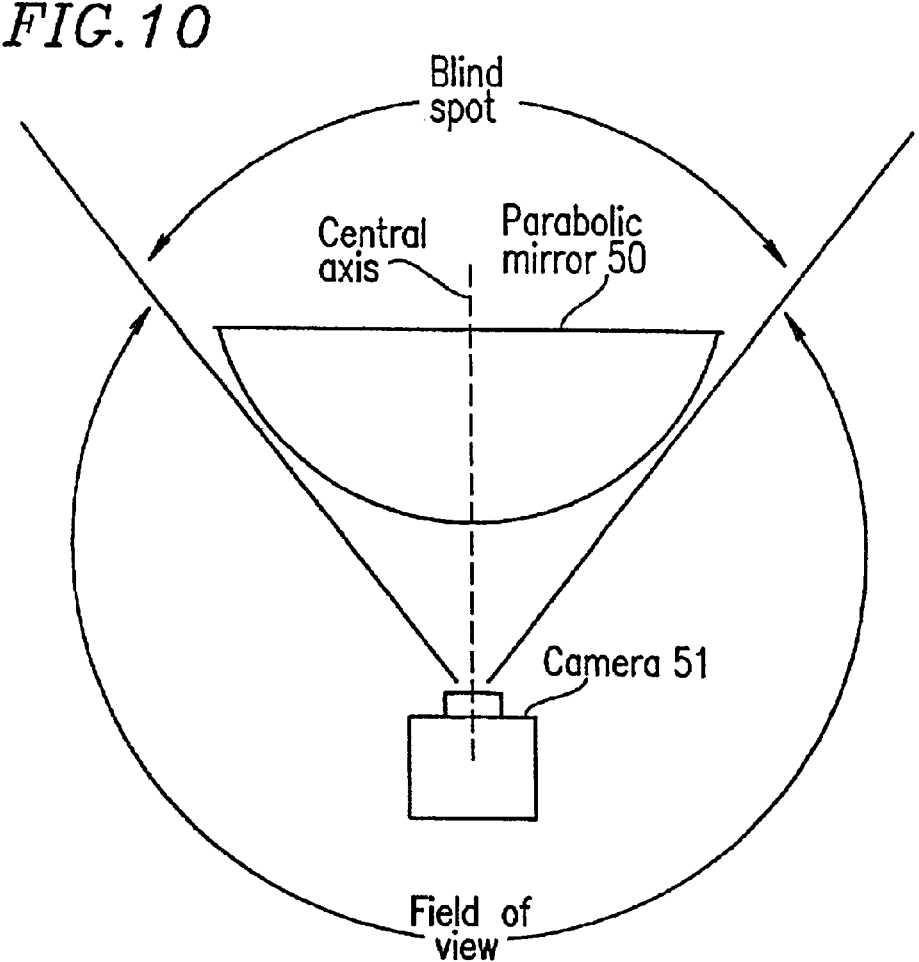

OMNIDIRECTIONAL VISION SENSOR

BACKGROUND OF THE INVENTION

1. Field of the Invention

The present invention relates to a vision sensor capable of omnidirectional observation encompassing a viewing range 360 degrees around the vision sensor. In particular, the present invention relates to an omnidirectional vision sensor which is used in a vision system for a monitoring camera system or a mobile robot, etc., and which can obtain field of view information associated with the entire surroundings in real-time.

2. Description of the Related Art

In recent years, various omnidirectional vision sensors have been proposed as input devices through which visual information covering a broad range is to be input to any device coupled to the omnidirectional vision sensors, with a view to developing applications for monitoring camera systems or mobile robots, etc.

The following techniques are known, for example:

① a method in which images which are captured by means of a single rotating camera are linked together (Japanese Laid-Open Publication No. 10-105840, entitled "System for automatically detecting an intruding object");

② a method in which images which are captured by means of a rotating plate mirror are linked together (Japanese Laid-Open Publication No. 11-4373, entitled "Method and apparatus for constructing omnidirectional panoramic images");

③ a method in which omnidirectional images are captured at one time by means of a plurality of fixed cameras (Japanese Laid-Open Publication No. 11-164292, entitled "Image generation device, image presentation device, image generation method and image synthesis method");

④ a method in which an image from a wide field of view is captured at one time by means of a wide-angle lens such as a fish-eye lens (Japanese Laid-Open Publication No. 11-355763, entitled "Monitor system and monitor method"); and ⑤ a method in which an image is captured at one time by means of a reflection mirror of a special shape such as a spherical, conical, hyperbolic, etc., shape (Japanese Laid-Open Publication No. 11-218409, entitled "Method and apparatus for measuring three-dimensional information").

Method ① mentioned above involves acquiring images of the surroundings by means of a single television camera which is placed on an electrically actuated base and is rotated by 360 degrees, where the images are linked together by image processing. By using this method, it is possible to acquire omnidirectional images with a relatively high resolution. However, since the camera is rotated while acquiring images, it is impossible to acquire omnidirectional images at one time, thus the resultant image is no longer a real-time image.

Method ② mentioned above involves rotating a mirror by 360 degrees so as to acquire images of the surroundings which are reflected by the mirror are captured by means of a fixed camera, where the images are linked together by image processing. Thus, it is possible to acquire omnidirectional images with a relatively high resolution, as is the case with method ①. However, since the mirror is rotated while acquiring images, it is impossible to acquire omnidirectional images at one time, thus resultant image is no longer a real-time image, as is the case with method ①.

Methods ① and ② mentioned above utilize a mechanical means for rotating a camera or a mirror, respectively, thus requiring some sort of maintenance work for the mechanical means in order to enable operation over a long period of time. Accordingly, methods ③ to ⑤ mentioned above have been proposed as methods which enable a one-time acquisition of omnidirectional images without employing any mechanical means.

Method ③ mentioned above involves acquiring omnidirectional images at one time by employing a plurality of fixed cameras, and is advantageous from the perspective of obtaining images in real-time. Moreover, since no special mechanical means is required, this method is suitable for long periods of use, and provides for good reliability. However, there is a problem in that the use of a plurality of camera leads to an increased system cost.

Methods ④ and ⑤ mentioned above employ a wide-angle lens or a reflection mirror of a specific shape to enable a one-time acquisition of an image from a wide field of view. As is the case with method ③ mentioned above, this method is advantageous from the perspective of obtaining images in real-time, and, since no special mechanical means is required, this method is suitable for long periods of use and provides for good reliability. Furthermore, unlike method ③ mentioned above, only one camera is required, thereby reducing the system cost. However, with methods ④ and ⑤, it is impossible to acquire complete omnidirectional images encompassing 360 degrees. In other words, the resultant field of view includes a blind spot(s).

Hereinafter, the field of view and blind spots which are inherent in methods ④ and ⑤ mentioned above will be described with reference to FIGS. 6 to 10. Each plane of FIGS. 6 to 10 is a vertical plane which contains a central axis therein, with a camera being disposed below a lens or a mirror.

FIG. 6 illustrates a field of view in the case where a wide-angle lens 10 is employed in method ④ mentioned above. When the system is constructed so that the wide-angle lens 10 is disposed with its convex portion "up" (as shown in FIG. 6), with the imaging means including a camera being located below the wide-angle lens 10, it would be possible to acquire an image from the space above a horizontal plane extending 360 degrees around the lens, an image of only an upper half of the surrounding sphere along the vertical direction can be captured. That is, the lower half of the surrounding sphere is left as a blind spot.

FIG. 7 illustrates a field of view in the case where a conical mirror 20 is employed as a body-of-revolution mirror in method ⑤ mentioned above. While the images captured by this method encompass a horizontal span covering 360 degrees around the mirror, the mirror face presents an obstacle along the vertical direction, creating a blind spot above and below the horizontal span. In other words, a blind spot exists in the "front" of the camera (imaging means).

FIG. 8 illustrates a field of view in the case where a spherical mirror 30 is employed as a body-of-revolution mirror in method ⑤ mentioned above. While the images captured by this method encompass a horizontal span covering 360 degrees around the mirror, the mirror face presents an obstacle along the vertical direction, creating a blind spot above the horizontal span. In other words, a blind spot exists in the "front" of the camera (imaging means).

FIG. 9 illustrates a field of view in the case where a hyperbolic mirror 40 is employed as a body-of-revolution mirror in method ⑤ mentioned above. While the images captured by this method encompass a horizontal span covering 360 degrees around the mirror, the mirror face presents an obstacle along the vertical direction, creating a blind spot above the horizontal span. In other words, a blind spot exists in the "front" of the camera (imaging means).

FIG. 10 illustrates a field of view in the case where a parabolic mirror 50 is employed as a body-of-revolution mirror in method ⑤ mentioned above. While the images captured by this method encompass a horizontal span covering 360 degrees around the mirror, the mirror face presents an obstacle along the vertical direction, creating a blind spot above the horizontal span. In other words, a blind spot exists in the "front" of the camera (imaging means).

Thus, according to any of methods ④ and ⑤ mentioned above, blind spots exist in a portion of the field of view. Method ④ is also disadvantageous in that the resultant field of view only expands in the upper direction, as described above. Therefore, when method ④ is implemented in a mobile robot, for example, only the ceiling of a building which accommodates the mobile robot would always be observed. Thus, method ④ does not enable sufficient observation of the lateral directions of the robot, which is essential in preventing the robot from colliding with other objects, while only permitting the observation of the upper region which does not require much attention.

In recent years, method ⑤ mentioned above, which involves the use of a body-of-revolution mirror, has attracted much attention because this method is advantageous from the perspective of obtaining images in real-time, low cost, and high reliability, in spite of some blind spots in a portion of the field of view. In particular, when method ⑤ is implemented with a hyperbolic mirror (among other bodies-of-revolution), an optical system of a perspective projection type is typically used. As a result, the obtained image can be easily converted to an image as seen from a focal point of the mirror (which should appear similar to an image which is imaged via a common camera), or an image which would be obtained by rotating a camera along a vertical axis (a cylindrical omnidirectional image). Thus, a greater variety of image processing is possible than any other method which employs mirrors. An omnidirectional visual system employing a hyperbolic mirror is described in Japanese Laid-Open Publication No. 6-295333.

However, in any variant of method ⑤ mentioned above, blind spots exist in the frontal direction of the camera (imaging means). In order to be able to apply omnidirectional vision sensors to a wide range of usage, it would be desirable to further reduce the blind spots.

SUMMARY OF THE INVENTION

According to the present invention, there is provided an omnidirectional vision sensor comprising: an optical system including a body-of-revolution mirror having a convex portion and having a symmetrical structure with respect to a revolution axis, wherein the body-of-revolution mirror includes a cutaway section in the convex portion of the body-of-revolution mirror so as to allow light incident from surroundings of the revolution axis of the body-of-revolution mirror to be collected; and imaging means, including a light-receiving element for receiving the collected light and image processing means for converting an optical image generated from the collected light received by the light-receiving element into image data, wherein the revolution axis of the body-of-revolution mirror and an optic axis of the light-receiving element coincide.

According to the above structure of the present invention, an area in the frontal direction of an imaging means (i.e., an upper direction of the optical system), which would be a blind spot in conventional structures, also becomes part of the field of view. Thus, according to the present invention, the field of view is expanded, as will be described more specifically in an embodiment to follow.

In one embodiment of the present invention, the optical system further comprises a wide-angle lens provided in the cutaway section of the body-of-revolution mirror, the wide-angle lens being disposed so that a convex portion of the wide-angle lens faces away from the imaging means.

According to the above structure of the present invention, the field of view can be expanded based on a further reduction of the blind spot, as will be described more specifically in an embodiment to follow.

In another embodiment of the present invention, a field of view of the wide-angle lens coincides with a blind spot of the body-of-revolution mirror.

According to the above structure of the present invention, the blind spot in the upper direction can be eliminated, as will be described more specifically in an embodiment to follow.

Thus, the invention described herein makes possible the advantages of providing an omnidirectional vision sensor which can be used in a wide range of applications, with substantially reduced blind spots compared with those associated with conventional omnidirectional vision sensors employing a body-of-revolution mirror (e.g., a conical mirror, a spherical mirror, a hyperbolic mirror, or a parabolic mirror).

This and other advantages of the present invention will become apparent to those skilled in the art upon reading and understanding the following detailed description with reference to the accompanying figures.

BRIEF DESCRIPTION OF THE DRAWINGS

FIG. 1 is a diagram illustrating an expanded field of view in accordance with an omnidirectional vision sensor according to one embodiment of the present invention.

FIG. 2 is a diagram illustrating an expanded field of view in accordance with an omnidirectional vision sensor according to another embodiment of the present invention.

FIG. 3 is a diagram illustrating images obtained on an imaging plane of a camera in accordance with an omnidirectional vision sensor according to one embodiment of the present invention.

FIG. 10 is a diagram illustrating a field of view and blind spots in a conventional structure employing a parabolic mirror.

DESCRIPTION OF THE PREFERRED EMBODIMENTS

Figure 4:
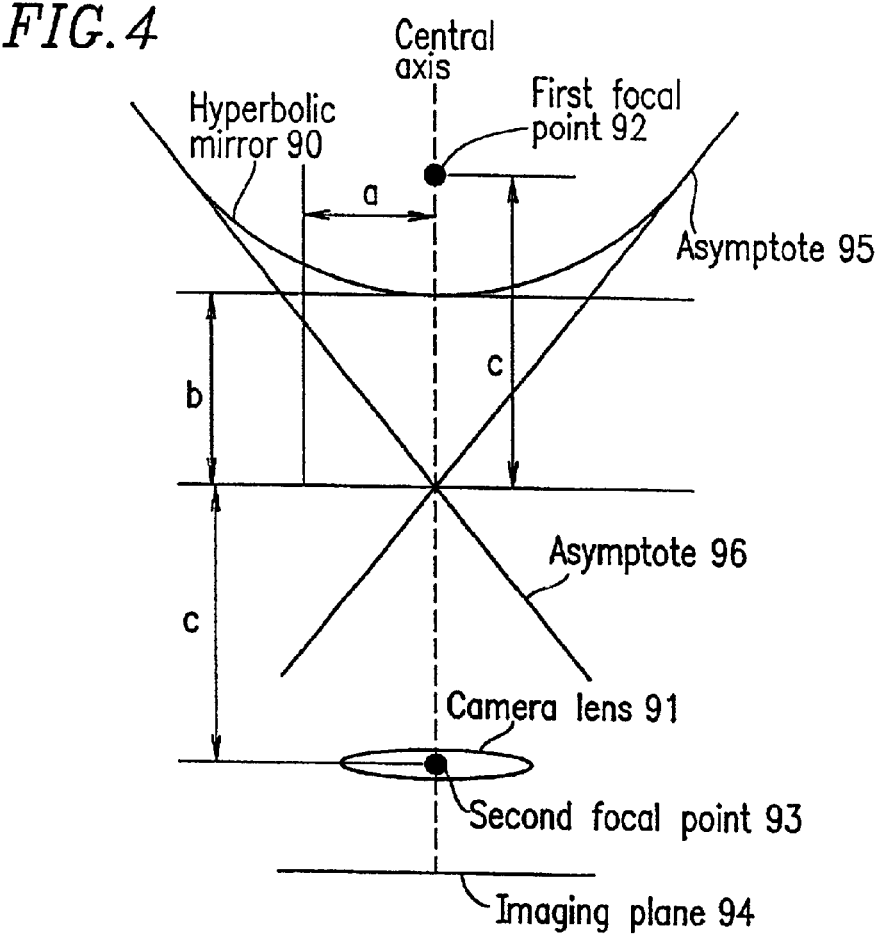
FIG. 4 is a diagram illustrating relative positions of a hyperbolic mirror and a camera in a conventional structure.

Now, the present invention will be described by way of illustrative examples, with reference to the accompanying figures.

Hereinafter, the word "upper" or "above" will be employed to mean a direction in which a body-of-revolution mirror is disposed relative to a camera, while "lower" or "below" means the opposite direction thereof. Thus, a body-of-revolution mirror will be referred to as being disposed in an "upper" direction of or "above" a camera, whereas the camera will be referred to as being disposed in a "lower" direction of or "below" the body-of-revolution mirror.

(Embodiment 1)

FIG. 1 is a diagram illustrating an omnidirectional vision sensor according to an embodiment of the present invention and a field of view provided thereby. The omnidirectional vision sensor includes a body-of-revolution mirror 60 and an imaging means 64. The body-of-revolution mirror 60 has a cutaway section 62 in the center of a convex portion thereof. The imaging means 64 includes: a camera 61 which has a light-receiving element (e.g., a camera lens) and an image processing means 63. According to the present invention, a body-of-revolution mirror is used as an exemplary optical system.

According to the present embodiment of the invention, an optical image which is generated by light reflected from the body-of-revolution mirror 60 and an optical image which is generated by light passing through the cutaway section 62 of the body-of-revolution mirror 60 (collectively referred to as light which is incident from the surroundings of the revolution axis) can be converted to image data, which is processed by the image processing means 63 in the imaging means 64 to give real-time images.

In each of the conventional omnidirectional vision sensors illustrated in FIGS. 7 to 10, where a body-of-revolution mirror (e.g., a conical mirror, spherical mirror, a hyperbolic mirror, a parabolic mirror) is employed as an optical system which provides a field of view encompassing a horizontal span covering 360 degrees around the lens, the mirror face presents an obstacle creating a blind spot in the frontal direction of the imaging means (a camera, etc.). On the other hand, the area below the mirror, which constitutes a part of the field of view, will only accommodate the camera and other elements of the imaging means.

In contrast, according to the present invention, as shown in FIG. 1, for example, the frontal direction of the camera 61 (the upper direction of the optical system) can be seen through the cutaway section 62 provided in a central portion of the convex portion of the body-of-revolution mirror 60, which is disposed so that the convex portion faces the camera 61. Thus, according to the present invention, the field of view can be expanded above the optical system where there is typically a blind spot in conventional structures. Although a blind spot is present in the rear direction of the camera 61 (i.e., the lower direction of the optical system), this only means that the camera 61 and the other elements in the imaging means are not captured within the field of view, which is not particularly problematic. The size of the cutaway section 62 can take various preferable ranges depending on the required angle of view. However, the cutaway section 62 preferably has a size at least equivalent to the field of view of the camera itself.

Furthermore, a wide-angle lens may be placed at the cutaway section 62 of the body-of-revolution mirror 60, with its convex portion facing away from the camera 61, to further reduce the blind spot in the frontal direction of the camera and expanding the field of view. This embodiment is shown in FIG. 2, as discussed below.

(Embodiment 2)

FIG. 2 is a diagram illustrating an omnidirectional vision sensor according to another embodiment of the present invention and a field of view provided thereby. The omnidirectional vision sensor includes a body-of-revolution mirror 70 and an imaging means 74. The body-of-revolution mirror 70 has a cutaway section 62 in the center of a convex portion thereof, with a wide-angle lens 72 being provided in the cutaway section 62. The imaging means 74 includes: a camera 71 which has a light-receiving element (e.g., a camera lens) and an image processing means 73.

As shown in FIG. 2, by selecting and positioning the wide-angle lens 72 so that the range of the field of view (angle of view) of the wide-angle lens 72 coincides with the blind spot associated with the body-of-revolution mirror 70, the blind spot in the frontal direction of the camera 71 can be substantially eliminated.

FIG. 3 shows images obtained on an imaging plane of a camera in accordance with an omnidirectional vision sensor according to the present invention. Since a body-of-revolution mirror is employed in the optical system according to the present embodiment of the invention, two concentric circular images are obtained. Specifically, an image which appears in an outer region 80 is an image of a horizontal span covering 360 degrees around the body-of-revolution mirror, obtained via the body-of-revolution mirror. An image which appears in an inner region 81 is an image of an area lying in the frontal direction of the camera which is obtained through the cutaway section of the body-of-revolution mirror. Thus, according to the present invention, an image of a horizontal span covering 360 degrees around and an image lying in the frontal direction of the camera can be simultaneously obtained. These two images may be linked together by being subjected to a panoramic conversion using conventionally-known image processing techniques, so that image information concerning an area which is conventionally a blind spot can be concurrently captured. Thus, images of a broader portion of the surroundings can be obtained in real-time according to the present embodiment of the invention.

In the above description, any reference to an "image" being captured by means of a "camera" is equivalent to a "still image" being captured by means of a camera. It will be appreciated that a "video image (i.e., moving images)" can be captured by means of a video camera. For example, by acquiring 30 still images per second and subjecting these still images to appropriate image processing, it would be possible to obtain a "video image (i.e., moving images)". As described above, the present invention makes it possible to acquire an omnidirectional image at one time in a real-time manner. In the following description, it should be appreciated that any reference to a "camera" and an "image" may also be read as a "video camera" and a "video image", respectively.

(Embodiments Employing a Hyperbolic Mirror)

Hereinafter, specific embodiments of the present invention, in which a hyperbolic mirror is employed as a body-of-revolution mirror, will be described in detail.

A conventional omnidirectional visual system employing a hyperbolic mirror is specifically described in Japanese Laid-Open Publication No. 6-295333, as mentioned above. As shown in FIG. 4, a hyperbolic mirror 90 and a camera are positioned so that a revolution axis (central axis) of the hyperbolic mirror 90 coincides with an optic axis of a light-receiving element (i.e., a lens 91) of the camera. The center of the camera lens 91 is placed at a second focal point 93 of the hyperbolic mirror 90. An imaging plane 94 is set so as to be away from the camera lens 91 by a distance equal to a focal length of the camera lens 91. Thus, image information representing a horizontal span covering 360 degrees around a first focal point 92 of the hyperbolic mirror 90 is imaged on the imaging plane 94.

With reference to FIG. 4, consider a coordinate system having an X axis and a Y axis extending in a horizontal plane (i.e., a plane parallel to the imaging plane 94), a Z axis extending in a vertical direction, and an origin which is defined as an intersection between asymptotes 95 and 96 of the hyperbolic mirror 90. According to this coordinate system, the surface of the hyperbolic mirror 90 can be represented by eq. 1:

$$(X^2+Y^2)/a^2 - Z^2/b^2 = -1 \qquad \text{eq. 1.}$$

In eq. 1, a and b are parameters for determining the shape of the hyperbolic. A distance c from the intersection between the asymptotes 95 and 96 to the first focal point 92 and the second focal point 93 of the hyperbolic mirror 90 can be represented by eq. 2:

$$c = \sqrt{(a^2+b^2)} \qquad \text{eq. 2.}$$

According to the present invention, a hyperbolic mirror 60 having a cutaway section 62 in the center of a convex portion thereof as shown in FIG. 1 is employed instead of the regularly-shaped hyperbolic mirror 90 shown in FIG. 4, along with the camera 61 and the image processing means 64 shown in FIG. 1. As a result, as shown in FIG. 3, an image which is similar to that directly taken by means of a common camera appears in the inner region 81.

In the above construction, there may still be a blind spot in a portion of the area lying in the frontal direction of the camera as shown in FIG. 1. In order to further reduce this blind spot, a wide-angle lens 72 can be provided in the cutaway section as shown in FIG. 2, thereby obtaining a further expanded field of view. Hereinafter, an exemplary design of the wide-angle lens 72 will be described.

Figure 5:
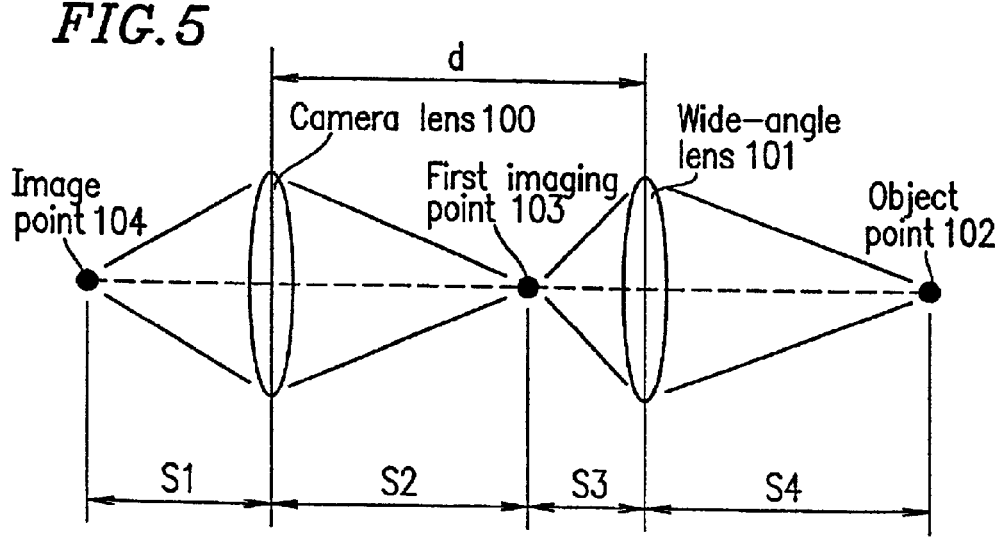
FIG. 5 is a diagram illustrating imaging relationship between a camera lens and a wide-angle lens.
Figure 6:
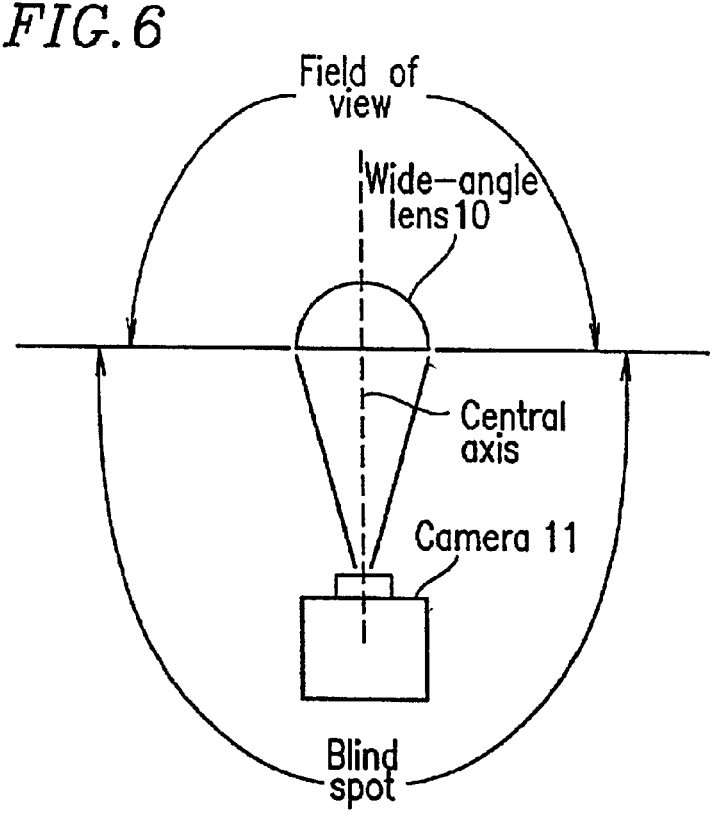
FIG. 6 is a diagram illustrating a field of view and blind spots in a conventional structure employing a wide-angle lens.
Figure 7:
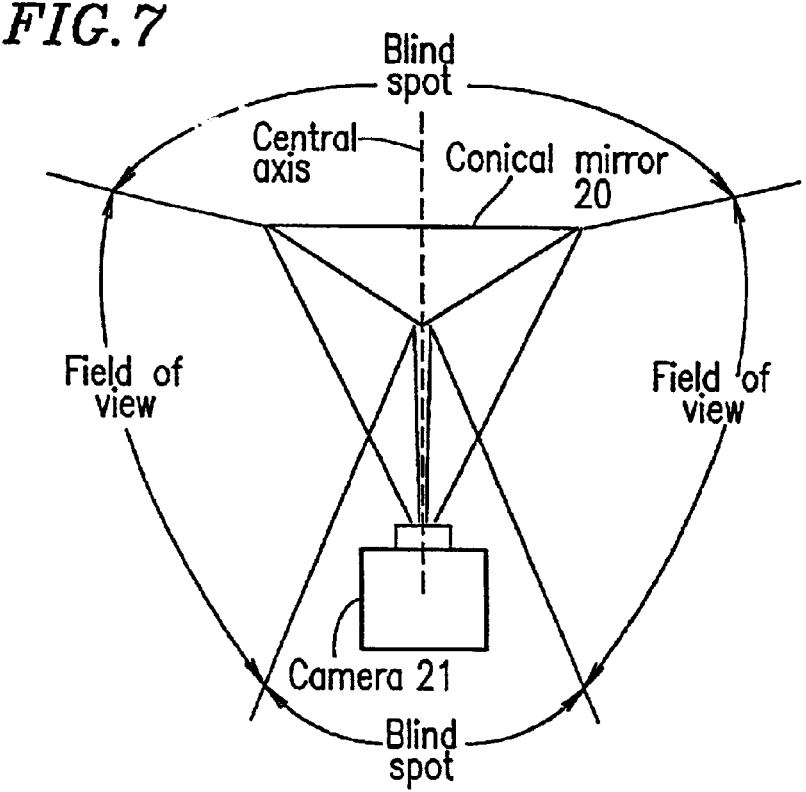
FIG. 7 is a diagram illustrating a field of view and blind spots in a conventional structure employing a conical mirror.
Figure 8:
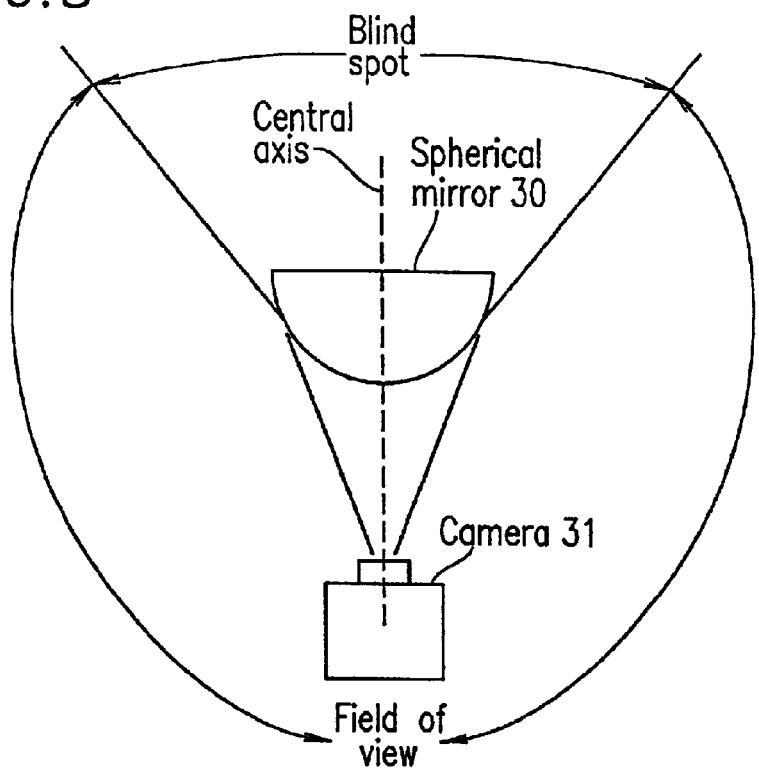
FIG. 8 is a diagram illustrating a field of view and blind spots in a conventional structure employing a spherical mirror.
Figure 9:
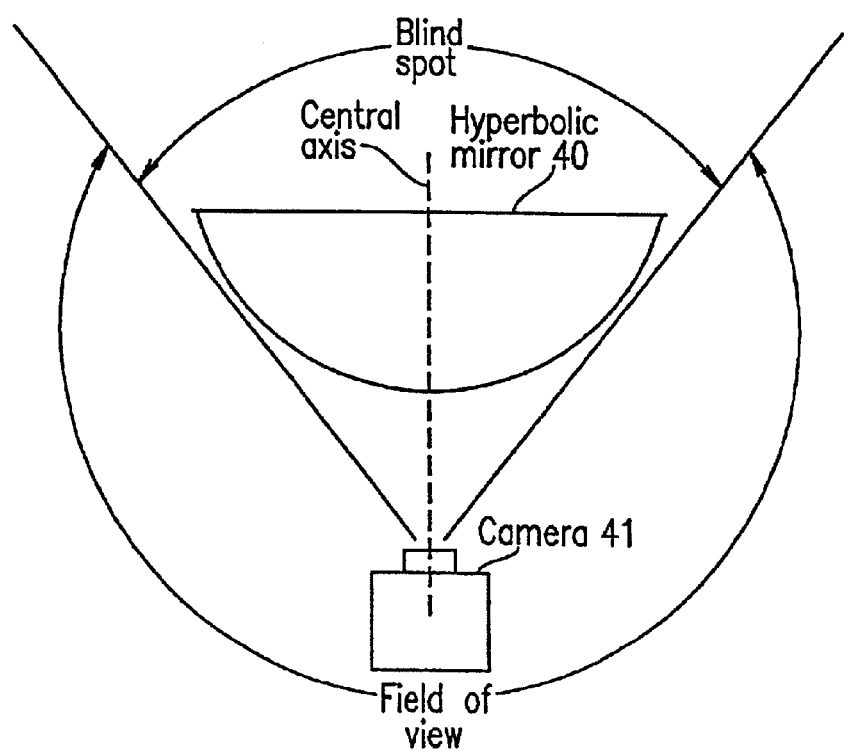
FIG. 9 is a diagram illustrating a field of view and blind spots in a conventional structure employing a hyperbolic mirror.

FIG. 5 is a diagram illustrating relative positions of a camera lens 100 and a wide-angle lens 101. The wide-angle lens 101 shown in FIG. 5 is a wide-angle lens which is to be placed in a cutaway section of a hyperbolic mirror according to the present invention. An image of an object point 102 is converged by the wide-angle lens 101 at a first imaging point 103. The image at the first imaging point 103 is converged by the camera lens 100 at an image point 104. Assuming that the camera lens 100 has a focal length f1; the wide-angle lens 101 has a focal length f2; the distance between the camera lens 100 and the image point 104 is S1; the distance between the camera lens 100 and the first imaging point 103 is S2; the distance between the wide-angle lens 101 and the first imaging point 103 is S3; and the distance between the wide-angle lens 101 and the object point 102 is S4, imaging formulae of the respective lenses 100 and 101 can be represented as:

$$1/S1 + 1/S2 = 1/f1 \qquad \text{eq. 3;}$$

and $$1/S3 + 1/S4 = 1/f2 \qquad \text{eq. 4.}$$

Now, assuming:

$$S2 + S3 = d \qquad \text{eq. 5,}$$

by constructing an omnidirectional vision sensor incorporating a hyperbolic mirror which has a cutaway section accommodating the wide-angle lens 101, such that the center of the wide-angle lens 101 is placed at a distance d from the camera lens 91 disposed at the second focal point 93 of the hyperbolic mirror 90 in FIG. 4, an image which is obtained through the wide-angle lens will appear as an image in the inner region 81 as illustrated in FIG. 3.

Furthermore, in FIG. 5, the optical system consisting of the camera lens 100 and the wide-angle lens 101 may be regarded as one synthetic lens system, having a focal length f which is defined as:

$$1/f = (f1 + f2 - d)/f1 \times f2 \qquad \text{eq. 6.}$$

Assuming that the synthetic lens system has a diameter D, its angle of view n can be defined as:

$$n = D/f \qquad \text{eq. 7.}$$

Now, in order to ensure that the angle of view of the wide-angle lens coincides with the blind spot of the hyperbolic mirror, the following relationship must be satisfied:

$$n = D/f = b/2 \times a \qquad \text{eq. 8.}$$

In eq. 8, a and b are fixed for a given shape of the hyperbolic mirror; f1 is fixed for the given camera lens 100; and d is determined in accordance with the diameter of the wide-angle lens 101. Therefore, by calculating f2 from eq. 6 to eq. 8, a wide-angle lens to be used for an omnidirectional vision sensor which is substantially free of blind spots can be designed.

Although the above embodiments illustrate the case where a hyperbolic mirror is employed as a body-of-revolution mirror, an omnidirectional vision sensor according to the present invention can be realized by employing any other type of body-of-revolution mirror, e.g., a conical mirror, a spherical mirror, or a parabolic mirror.

For example, an omnidirectional vision sensor incorporating a body-of-revolution mirror which has a cutaway section can be realize by selecting the depth of field of a camera so that the field of view information obtained via the cutaway section is converged on the imaging plane of the camera. A wide-angle lens may be further incorporated in the omnidirectional vision sensor, the wide-angle lens being disposed at a distance as calculated in accordance with eq. 5. Furthermore, an omnidirectional vision sensor in which an angle of view of the wide-angle lens coincides with a blind spot of the body-of-revolution mirror can be realized by, for a given blind spot of the body-of-revolution mirror used, selecting a wide-angle lens whose angle of view as calculated in accordance with eq. 7 coincides with the blind spot.

As described above, according to the present invention, there is provided a highly-reliable omnidirectional vision sensor which does not require a special mechanical means and has substantially less blind spots than those associated with conventional omnidirectional vision sensors, such that information concerning a horizontal span covering 360 degrees around the sensor can be obtained in real-time. The omnidirectional vision sensor can be very effectively used in a vision system for a monitoring camera system or a mobile robot, etc. Since only one camera (which tends to be expensive) is required, a vision sensor for making an omnidirectional observation can be realized at a relatively low cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An omnidirectional vision sensor comprising:

an optical system including a body-of-revolution mirror having a convex portion so as to be able to obtain an image in a field of viewing range 360 degrees around the vision sensor, a light-receiving element whose optical axis is positioned in coincidence with a revolution axis of the body-of-revolution mirror, and imaging means for converting an optical image obtained by the light-receiving element through the optical system to an image data;

wherein the body-of-revolution mirror is positioned so as to place the convex portion side of the body-of-revolution mirror facing to the imaging means side; the body-of-revolution mirror includes a cutaway section at the center of the convex portion of the body-of-revolution mirror; and a wide-angle lens having a convex portion at its one side is provided within the cutaway section of the body-of-revolution mirror to place the convex portion of the wide-angle lens facing to the opposite side of the imaging means so that the imaging means is able to make an image process for an image at front side through the wide-angle lens provided within the cutaway-section of the body-of-revolution mirror.

2. An omnidirectional vision sensor according to claim 1, wherein a field of view of the wide-angle lens coincides with a blind spot of the body-of-revolution mirror.

3. An omnidirectional vision sensor according to claim 1, wherein the body-of-revolution mirror is an hyperbolic mirror.

4. An omnidirectional vision sensor according to claim 1, wherein the body-of-revolution mirror is a spherical mirror.

5. An omnidirectional vision sensor according to claim 1, wherein the body-of-revolution mirror is a conical mirror.

6. An omnidirectional vision sensor according to claim 1, wherein the body-of-revolution mirror is a parabolic mirror.

7. An omnidirectional vision sensor according to claim 2, wherein the body-of-revolution mirror is an hyperbolic mirror.

8. An omnidirectional vision sensor according to claim 2, wherein the body-of-revolution mirror is a spherical mirror.

9. An omnidirectional vision sensor according to claim 2, wherein the body-of-revolution mirror is a conical mirror.

10. An omnidirectional vision sensor according to claim 2, wherein the body-of-revolution mirror is a parabolic mirror.

* * * * *